(12) United States Patent
Marimuthu

(10) Patent No.: US 10,178,223 B1
(45) Date of Patent: Jan. 8, 2019

(54) FRAUDULENT SUBSCRIBER IDENTITY MODULE (SIM) SWAP DETECTION

(71) Applicant: Symantec Corporation, Mountain View, CA (US)

(72) Inventor: Venkadesan Marimuthu, Chennai (IN)

(73) Assignee: Symantec Corporation, Mountain View, CA (US)

(*) Notice: Subject to any disclaimer, the term of this patent is extended or adjusted under 35 U.S.C. 154(b) by 0 days.

(21) Appl. No.: 15/582,763

(22) Filed: Apr. 30, 2017

(51) Int. Cl.
| H04W 12/12 | (2009.01) |
| H04M 1/725 | (2006.01) |
| H04B 1/3816 | (2015.01) |
| H04M 1/66 | (2006.01) |
| H04W 4/02 | (2018.01) |
| H04W 84/12 | (2009.01) |

(52) U.S. Cl.
CPC ...... H04M 1/72577 (2013.01); H04B 1/3816 (2013.01); H04M 1/66 (2013.01); H04W 4/02 (2013.01); *H04W 84/12* (2013.01)

(58) Field of Classification Search
CPC ...... H04W 12/06; H04W 12/02; H04W 12/12
See application file for complete search history.

(56) References Cited

U.S. PATENT DOCUMENTS

| 9,913,216 B1* | 3/2018 | Deshpande | |
| 2007/0264974 A1* | 11/2007 | Frank et al. | |
| 2016/0021532 A1* | 1/2016 | Schenk | H04B 1/3816 455/558 |
| 2017/0331819 A1* | 11/2017 | Quirke | G06F 21/35 |

OTHER PUBLICATIONS

Help Net Security, "SIM Swap fraud is gaining momentum", Apr. 2016.*
Smart Android, "No Signal Alert Pro", 2012.*
"SIM Card Change Notifier," <https://play.google.com/store/apps/details?id=instigate.simCardChangeNotifier&hl=en>, Retrieved on Apr. 28, 2017, 1 page.
"No Signal Alert," <https://play.google.com/store/apps/details?id=com.smartandroidapps.missedcall&hl=en>, Retrieved on Apr. 28, 2017, 1 page.

(Continued)

*Primary Examiner* — Dung Hong
(74) *Attorney, Agent, or Firm* — Patent Law Works LLP

(57) ABSTRACT

Detecting a fraudulent subscriber identity module (SIM) swap may be performed by a mobile app executing on a mobile computing device. A network connectivity state is determined for the mobile computing device to a mobile telephony network provided by a mobile network operator. The mobile computing device is associated with a SIM which is associated with the mobile network operator. A signal strength is determined at the mobile computing device of the mobile telephony network provided by the mobile network operator. A likelihood is determined that a SIM swap has taken place involving the SIM based on the signal strength and the network connectivity state. In some embodiments, a probe request is transmitted to a remote server, requesting that the remote server programmatically call the telephone number associated with the SIM to confirm whether the SIM swap has taken place.

20 Claims, 6 Drawing Sheets

(56) References Cited

OTHER PUBLICATIONS

"SIM Swap Monitor," <https://play.google.com/store/apps/details?id=com.bigsemite.simswap&hl=en>, Retrieved on Apr. 28, 2017, 1 page.

TheAntiSocialEngineer, "Sim Swap Fraud—Porting your digital life in minutes," May 4, 2016, 13 pages.

Cambell, "Everything you need to know about SIM swap scams," Feb. 12, 2016, 4 pages.

Jordaan et al., "A Biometrics-based Solution to Combat SIM Swap Fraud," iNetSec'10 Proceedings of the 2010 IFIP WG 11.4 international conference on Open research problems in network security, Mar. 5-6, 2010, 19 pages.

Isedicii, "Securing Identity, Protecting Business." <https://www.sedicii.com>, Retrieved on Apr. 28, 2017, 2 pages.

"Device Trust, What is it?" <https://www.validsoft.com/tech-tour/device-trust-technology>, Retrieved on Apr. 28, 2017, 2 pages.

"Financial Services," IMImobile—Financial Services Solutions <https://imimobile.com/financial-services/>, Retrieved on Apr. 28, 2017, 4 pages.

"Ezio Mobile Protector—secure online transactions with your smartphone," Gemalto, 2015, 4 pages.

"Make an Outbound Phone Call," <https://www.plivo.com/docs/getting-started/making-outbound-calls/>, Retrieved on Apr. 28, 2017, 5 pages.

\* cited by examiner

FRAUDULENT SUBSCRIBER IDENTITY MODULE (SIM) SWAP DETECTION

TECHNICAL FIELD

This disclosure pertains generally to detecting identity theft, and more specifically to detecting and mitigating Subscriber Identity Module (SIM) swap fraud.

BACKGROUND

In order to authenticate a user's identity, systems often require that the user prove that they know something, have something, or are something. For example, a website may require that a user know a user name and password to gain access.

Due to how ubiquitous mobile phone possession is, mobile phones are increasingly being used in user authentication. For example, a simple messaging service (SMS) text message may include a one-time password (OTP) sent to a mobile phone in a multi-factor authentication process. As another example, mobile transaction authentication numbers (mTAN) are used in many banking systems throughout the world to authenticate a user requesting a banking transaction. With an mTAN, a user is sent a SMS text message that usually includes a six digit transaction authentication number (TAN) and sometimes the parameters for the requested transaction such as amount, destination account, etc.

With the increased use of mobile phones as a medium for authentication, criminals have identified a lucrative new mechanism to defraud victims. Subscriber Identity Module (SIM) swap fraud is a technique that involves a fraudster associating a SIM card with the victim's mobile telephone number. In other words, through the use of social engineering (e.g., impersonating the victim) or other techniques, the operator of the mobile telephone network is tricked into deactivating the victim's legitimate SIM card, and activating a SIM card controlled by the fraudulent party in association with the victim's mobile phone number. This has the effect of hijacking the victim's mobile phone number, such that any phone calls or text messages sent to the victim's mobile telephone number (including authentication messages) are sent to the fraudster. The fraudster can then exploit any accounts that are tied to the victim's mobile telephone number.

It is to be understood that a Subscriber Identity Module (SIM) is an integrated circuit that securely stores information (e.g., an international mobile subscriber identity (IMSI) number and its related key) which is used to identify and authenticate subscribers on mobile telephony devices (such as cellular phones, satellite phones and computers). Typically, a SIM is implemented as a card (made of, e.g., PVC), containing semiconductors and embedded contacts, which can be inserted into and communicatively coupled with the mobile telephony device. Typically, a SIM is registered with and activated by the operator of the mobile telephony network, which then uses the SIM card to authenticate the subscriber and ensure s/he is authorized to use the network.

Technology that seeks to mitigate mobile phone based authentication fraud is sometimes based on tighter integration with the operator of the mobile telephony network or the provider requesting authentication. However, such solutions are limited in their scope and appeal.

It would be desirable to address these issues.

SUMMARY

A method for detecting a fraudulent SIM swap is implemented with a computing device, specifically with a mobile app executing on a mobile computing device, such as a smartphone or other mobile telephony device. A network connectivity state is determined for the mobile computing device to a mobile telephony network provided by a mobile network operator (e.g., a cellular network). The mobile computing device is associated with a SIM (e.g., a SIM card) which is in turn associated with the mobile network operator. A signal strength is determined at the mobile computing device of the mobile telephony network provided by the mobile network operator. A likelihood is determined that a subscriber identity module swap has taken place involving the subscriber identity module based on the signal strength and the network connectivity state. In some cases, it may be sufficient to conclude that a subscriber identity module swap has taken place where it can be determined that the signal strength for the mobile telephony network at the mobile computing device is above a predetermined threshold.

The user of the mobile computing device can be notified of the likelihood that a fraudulent swap has occurred involving the SIM associated with the mobile computing device. To aid in this process, where it is determined that the wireless local area network (WLAN) status of the mobile computing device is set to "disabled," the user can be prompted to enable the wireless local area network element of the mobile computing device.

In some embodiments, a probe request is transmitted to a remote server, requesting that the remote server programmatically call the telephone number associated with the SIM. A corresponding indication is received that the mobile computing device can expect to receive an incoming telephone call. It can then be determined whether the mobile computing device received the expected incoming telephone call. The likelihood that the SIM swap has taken place can be further determined based on the received indication that the mobile computer device can expect to receive the incoming telephone call and the determination of whether the mobile computer device actually received the expected incoming telephone call.

For example, where the expected incoming telephone call was not received by the potential victim's mobile computing device, it may be confirmed that a SIM swap has taken place. A call status can be received from the remote server to confirm that a SIM swap has taken place. For instance, the call status might indicate that the telephone number was callable but the incoming telephone call was not received. Sometimes a caller identification (caller ID) might be used to differentiate the expected incoming telephone call initiated programmatically by the remote server from a random incoming call that happens to occur at the same time. Specifically, the caller ID can help determine whether the mobile computing device correctly received the expected incoming telephone call. Another mechanism that can be used to determine whether the mobile computing device received the expected incoming telephone call is to wait for a predetermined amount of time to elapse. A programmatic telephone call should only take a few seconds to initialize and connect, so if a given period of time has passed without the victim's mobile computer device receiving a telephone call, it can be assumed that a SIM swap has occurred.

A geolocation of the mobile computing device can be determined and transmitted to a remote server. The geolocation might be analyzed against a coverage map for the mobile network operator to determine a likelihood that a SIM swap has taken place.

Notification that the SIM swap has taken place can be transmitted to an identity theft protection service provider. In this way, the identity theft protection service provider can swiftly take actions to mitigate the potential losses incurred from the SIM swap.

Various mechanisms may be used to verify that a SIM swap has taken place. For example, it can be determined that a connection has been lost for a threshold amount of time. Additionally, responsive to the connection having been lost for the threshold amount of time the signal strength to the mobile telephony network may be measured. If the signal strength is above a predetermined threshold, it can be assumed that a SIM swap has taken place. Further, if the mobile computing device's ability to place telephone calls on the mobile telephony network is limited to emergency calls, in some cases that may be indicative that a SIM swap has taken place.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict various embodiments for purposes of illustration only. One skilled in the art will readily recognize from the following discussion that alternative embodiments of the structures and methods illustrated herein may be employed without departing from the principles described herein.

DETAILED DESCRIPTION

With a fraudulent SIM swap, a fraudster manages to get the victim's SIM deactivated and a replacement activated, without the victim's knowledge. Thus, victims often have no idea that their mobile phone number associated with their SIM has been hacked by the fraudster. By gaining this phone number of the victim, the fraudster can go ahead and reset the victim's online accounts. The technology discussed herein can alert the user quickly so that damage can be prevented or minimized.

Figure 1:
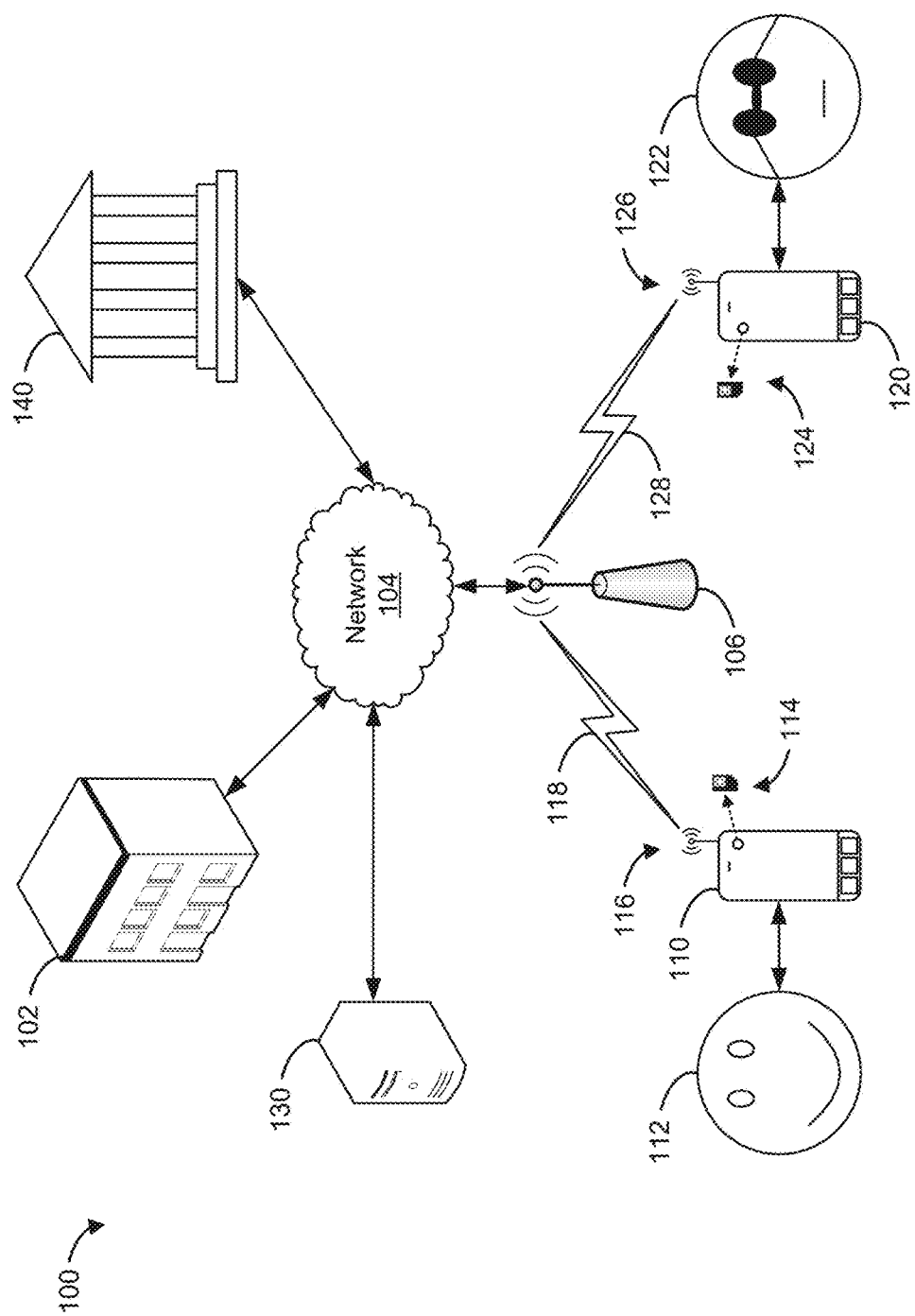
FIG. 1 is a schematic drawing of fraudulent SIM swap detection, according to some embodiments.

FIG. 1 is a schematic drawing 100 of fraudulent SIM swap detection, according to some embodiments. Amongst other things, the schematic drawing 100 includes a mobile network operator 102, a network 104, a mobile network 106, a victim 112, and a perpetrator 122.

The mobile network operator 102 may be a cellular network operator, which manages a network of cellular base stations which mobile phones and data terminals connect to. One example technology that the mobile network operator 102 may use to implement the mobile telephony network 106 is the long-term evolution (LTE) standard developed by the 3rd generation partnership project (3GPP). Other options are also possible, such as satellite networks or WiMax (802.16). In some cases, various management components that the mobile network operator 102 uses to manage the mobile telephony network 106 may operate over an intermediate network 104. For example, some mobile network operators may have a mechanism to change subscriber information through an Internet web portal (e.g., activate SIM cards, deactivate SIM cards, associate a telephone number with a SIM card, etc.)

While the mobile telephony network 106 is depicted as a single base station, it is understood that a mobile telephony network generally has significantly more base stations. Often times, the coverage area that the sum of the base stations of the mobile telephony network 106 cover may include a majority of a country's, or a regulatory body's, jurisdictional area. Further, the network 104, while depicted as a single cloud, may include any number of intervening public and/or private networks.

The victim 112, as indicated by the control arrows, has possession of a mobile phone 110 that has a mobile telephony network interface 116 for interfacing with the mobile telephony network 106 over a wireless connection 118. The perpetrator 122 also has a mobile phone 120 that has a mobile telephony network interface 126 for interfacing with the mobile telephony network 106 over a wireless connection 128.

The victim's 122 mobile phone 110 may have a SIM card 114 inserted into it that identifies the victim's account with the mobile network operator 102. For example, in establishing the wireless connection 118, the mobile telephony network 106 may communicate with a subscriber authentication service of the mobile network operator 102. Further, the mobile network operator 102 may associate the SIM card 114 with a telephone number.

Through a variety of means, the perpetrator 122 may instruct the mobile network operator 102 to associate the SIM card 124 that s/he has possession of, as needing to be associated with the telephone number that is currently associated with victim's 112 SIM card 114. For example, the perpetrator 122 may tell the mobile network operator 102 that s/he is the victim and that s/he has lost or misplaced the victim's 112 SIM card 114. The perpetrator 122 may successfully convince the operator 102 to deactivate the victim's 112 SIM card 114 and activate the perpetrator's 122 SIM card 124, in association with the victim's mobile phone number. Once the perpetrator's 122 SIM card 124 is activated and associated with the victim's telephone number, the perpetrator 122 may use the SIM card 124 to defraud the victim 112. For instance, the perpetrator 122 may contact an institution 140 at which the victim 112 has an account and steal identity information, money, etc. from the victim 112. The schematic drawing 100, including the remote server 130, will be discussed in additional detail further below to describe the SIM swap detection discussed herein.

Figure 2:
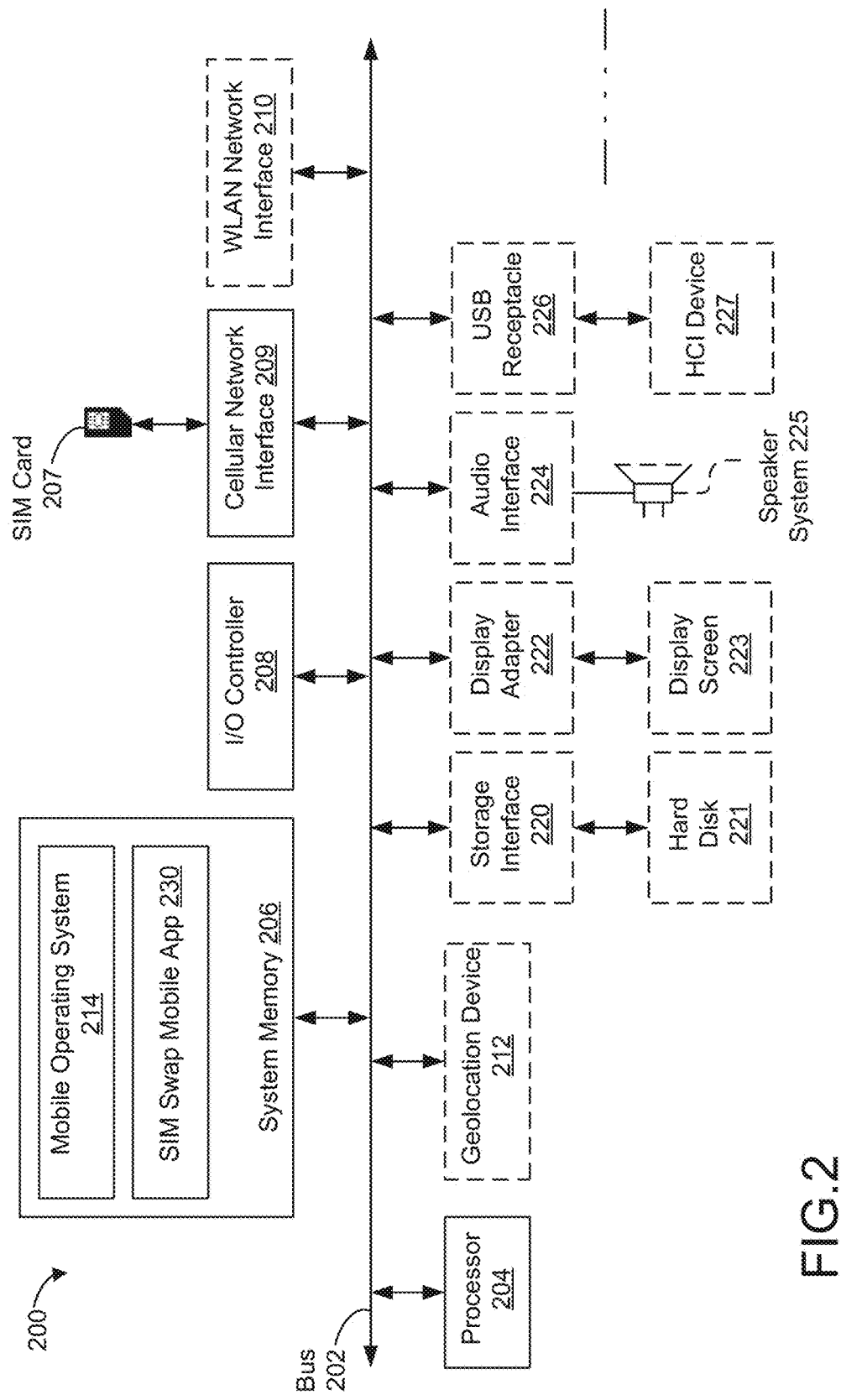
FIG. 2 is a block of a computer system suitable for implementing a SIM swap mobile app, according to some embodiments.

FIG. 2 is a block of a computer system 200 suitable for implementing a SIM swap mobile app, according to some embodiments. For example, the computer system 200 may be a mobile computing device such as a smartphone or other form of mobile telephony device.

As illustrated, one component of the computer system 200 is a bus 202. The bus 202 communicatively couples other components of the computer system 200, such as at least one processor 204, system memory 206 (e.g., random access memory (RAM), read-only memory (ROM), flash memory), an input/output (I/O) controller 208, a cellular (or other type of mobile telephony) network interface 209, a WLAN network interface 210 and a geolocation device 212 (e.g., a GPS receiver).

The cellular network interface 209 and the WLAN network interface 210 may include a variety of protocols to connect to mobile telephony networks, local WiFi networks and/or the Internet. In general, the cellular network interface 209 may use a cellular network standard such as the LTE interface or the universal mobile telecommunications system (UTMS) interface, whereas the WLAN network interface may comport with the an Institute of Electrical and Electronics Engineers' (IEEE) 802.11 wireless local area network (WLAN) or wireless Ethernet interface. In some embodiments, the computer system 200 may have multiple network interfaces that provide connectivity to several types of networks concurrently or non-concurrently, such as that depicted in the computer system 200. The cellular network interface 209 may be communicatively coupled to a SIM card 207. The SIM card is used to provide subscriber information to the mobile network operator 102 to gain access to the mobile network 106.

The bus 202 may also be communicatively coupled to other optional components such as a storage interface 220 communicatively coupled to one or more hard disk(s) 221 (or other form(s) of storage media), a display adapter 222 communicatively coupled to a video output device such as a display screen 223, an audio output interface 224 communicatively coupled to an audio output device such as a speaker 225, and one or more interfaces such as a universal serial bus (USB) receptacle 226 communicatively coupled to various peripherals such as human-computer interaction (HCI) devices 227 (e.g. keyboard, mice, sensors, etc.).

The bus 202 allows data communication between the processor 204 and system memory 206, which, as noted above may include ROM and/or flash memory as well as RAM. The RAM is typically the main memory into which the operating system and application programs are loaded. The ROM and/or flash memory can contain, among other code, the Basic Input-Output system (BIOS) which controls certain basic hardware operations. Application programs can be stored on a local computer readable medium (e.g., hard disk 221, flash memory, ROM, etc.) and loaded into system memory 206 and executed by the processor 204. Application programs can also be loaded into system memory 206 from a remote location (i.e., a remotely located server 130), for example via the network interfaces. In FIG. 2, a SIM swap mobile app 230 is illustrated as residing in system memory 206. The workings of the SIM swap mobile app 230 are explained in greater detail below in conjunction with FIGS. 3-6.

A mobile operating system 214 is also illustrated as residing in system memory 206. The mobile operating system 214 may provide an interface between mobile apps and hardware of the computer system 200. For instance, the mobile operating system 214 may include drivers to control and receive data from the network interfaces 209, 210, geolocation device 212, etc. Further, the mobile operating system 214 may include an application programming interface (API) to provide application programs such as the SIM swap mobile app 230 access to operating system services. The mobile operating system 214 may also provide a common operating environment for mobile apps. Some non-exhaustive examples of mobile operating systems are iOS®, Android® and Windows 10 Mobile®.

The storage interface 220 is coupled to one or more hard disks 221 (and/or other standard storage media). The hard disk(s) 221 may be a part of computer system 200, or may be physically separate and accessed through other interface systems.

Figure 3:
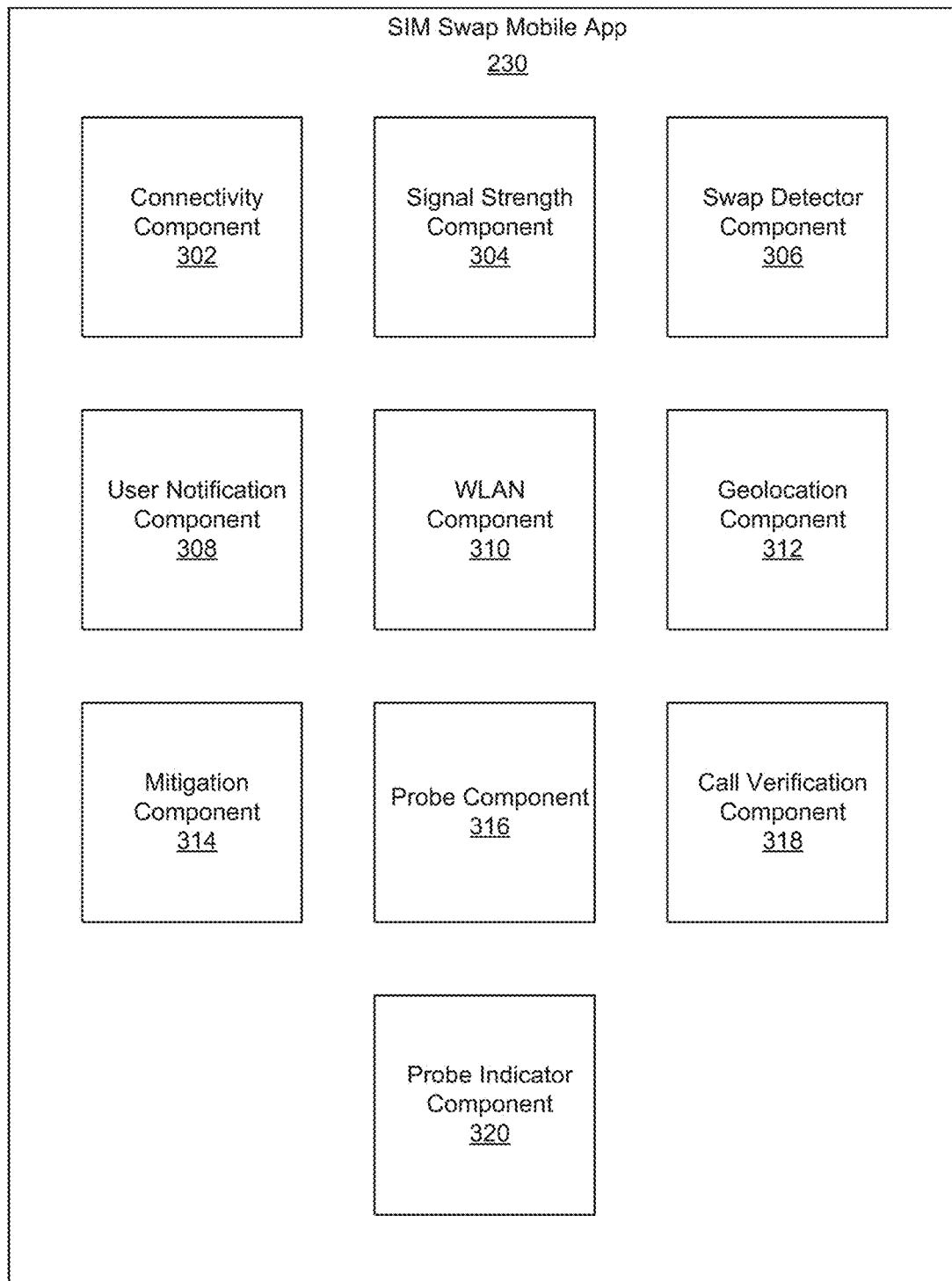
FIG. 3 is a block diagram of a SIM swap mobile app, according to some embodiments.
Figure 4:
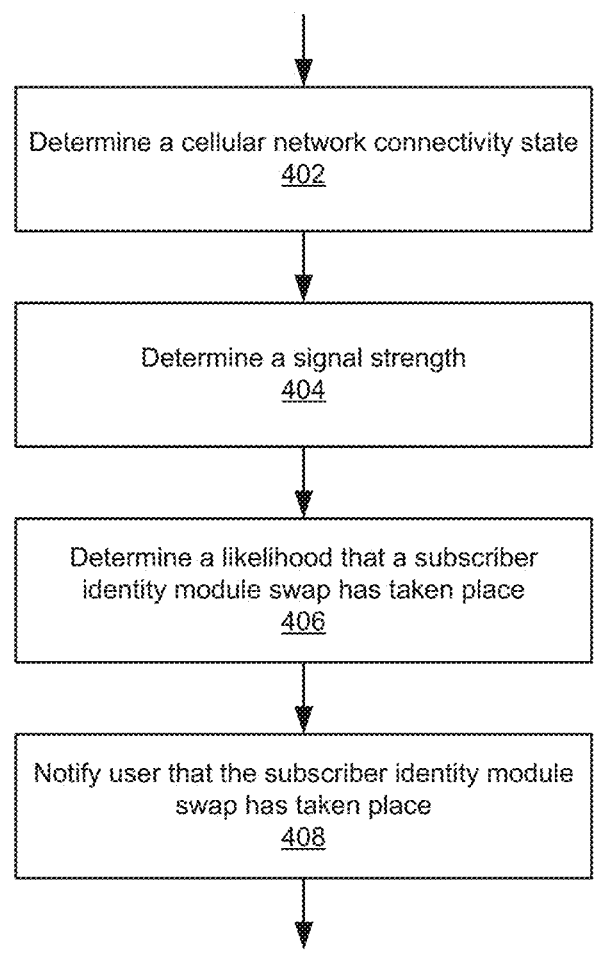
FIG. 4 is a flowchart of a method for detecting fraudulent SIM swaps, according to some embodiments.
Figure 5:
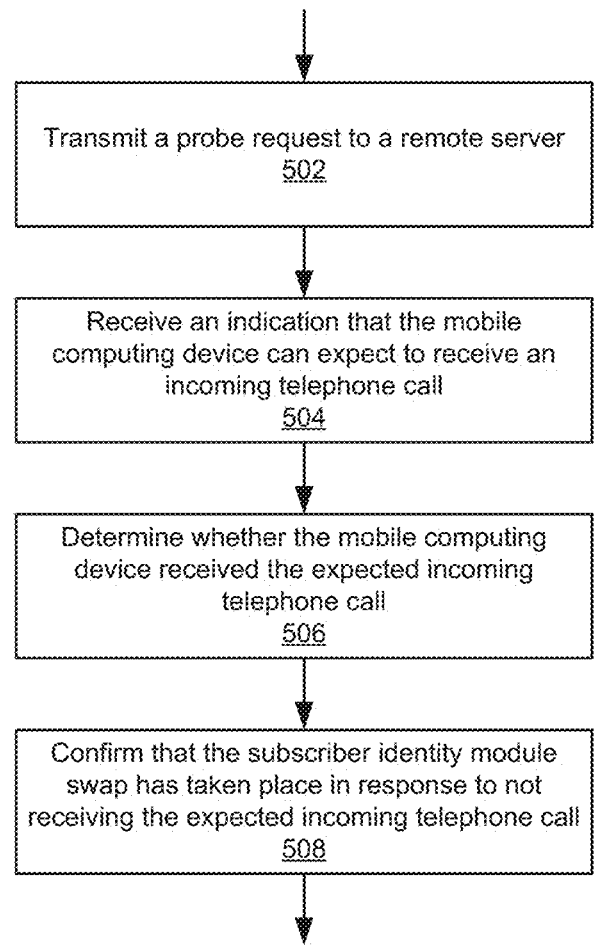
FIG. 5 is a flowchart of a method for detecting fraudulent SIM swaps involving a programmatic telephone call, according to some embodiments.
Figure 6:
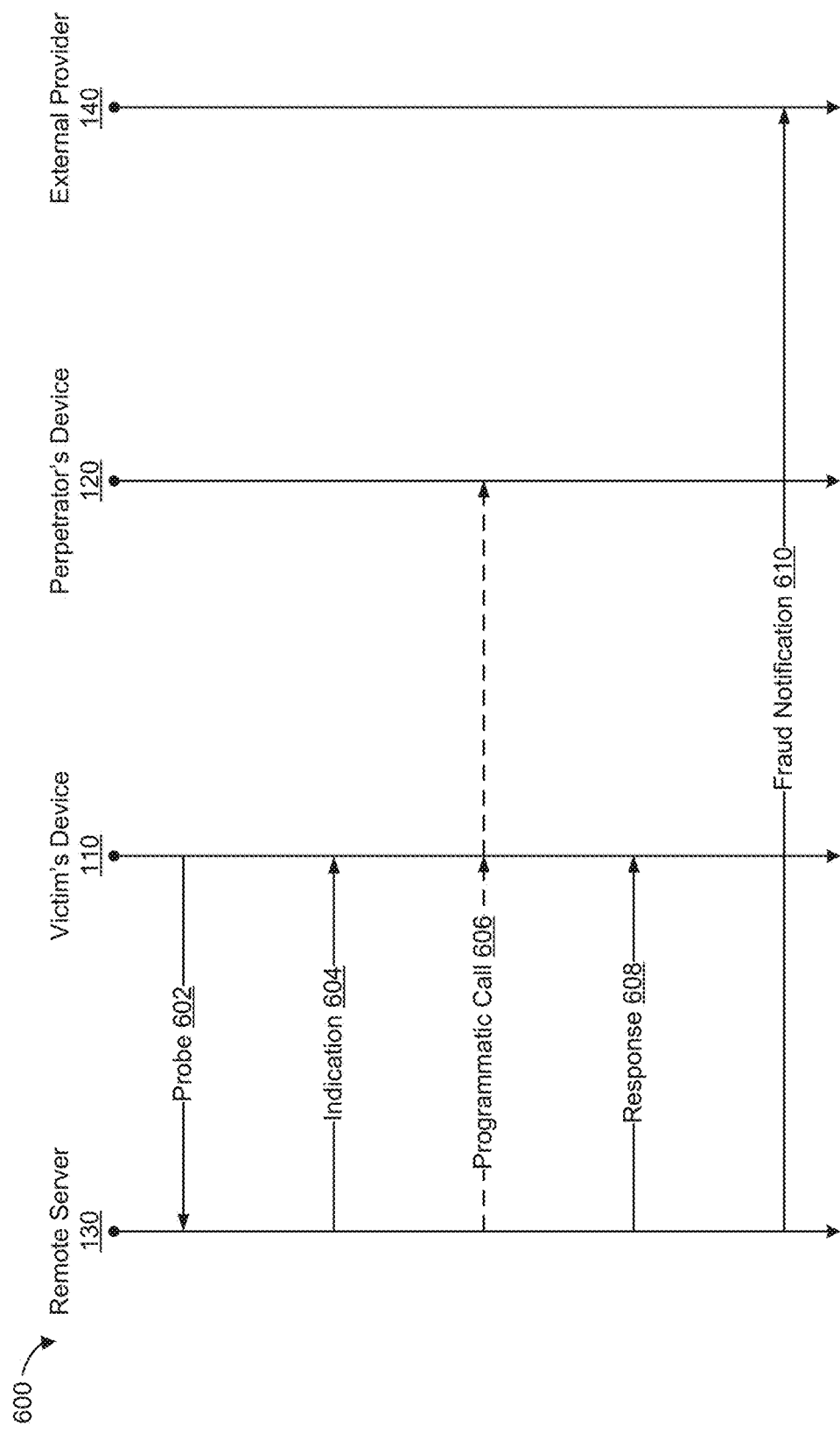
FIG. 6 is a message sequence chart of a method for detecting fraudulent SIM swaps, according to some embodiments.

For simplicity of discussion, the remaining figures are discussed together below. FIG. 3 is a block diagram of a SIM swap mobile app 230, according to some embodiments. FIG. 4 is a flowchart of a method 400 for detecting fraudulent SIM swaps, according to some embodiments. FIG. 5 is a flowchart 500 of a method for detecting fraudulent SIM swaps involving a programmatic telephone call, according to some embodiments. FIG. 6 is a message sequence chart 600 of a method for detecting fraudulent SIM swaps, according to some embodiments.

The SIM swap mobile app 230 includes a connectivity component 302, a signal strength component 304, a swap detector component 306, a user notification component 308, a WLAN component 310, a geolocation component 312, a mitigation component 314, a probe component 316, a call verification component 318, and a probe indicator component 320.

The connectivity component 302 can determine 402 a network connectivity state for the mobile computing device 110 to the mobile telephony network 106 provided by a mobile network operator 102. The connectivity component 302 may continually, or periodically, monitor the mobile computing device's 110 connectivity to the mobile telephony network 106. For example, the connectivity component 302 can determine if the mobile computing device 110 is associated with a base station by querying the mobile operating system 214 through an application programming interface (API). As an example, the mobile operating system 214 may be able to tell the connectivity component 302 whether the SIM card 114 has successfully authenticated to the mobile telephony network 106, which mobile network operators are visible to the mobile computing device 110, etc. The connectivity component 302 may also determine how long connectivity has been lost, and whether the lost connectivity duration exceeds a predetermined amount of time.

The connectivity component 302 can also determine whether the network connectivity state is limited to emergency telephone calls. Many mobile operating systems allow users to place emergency calls even when they are not authenticated to any mobile telephony network in range. For example, the connectivity component 302 may access an API on the mobile operating system 214 to determine whether the mobile computing device is limited to emergency telephone calls on the mobile telephony network. As another example, the connectivity component 302 may attempt to ping an Internet host or programmatically place a test phone call to a non-emergency number. Further, the connectivity component 302 may verify through the mobile operating system 214 that the mobile computing device 110 is attempting to connect to a mobile telephony network that is associated with the SIM card 114 inserted in the mobile computing device 110. Sometimes, when a mobile computing device loses network connectivity to a mobile telephony network, the mobile computing device may attempt to roam or provide limited emergency-only network connectivity through another mobile telephony network in range.

The signal strength component 304 can determine 404 a signal strength at the mobile computing device 110 of the mobile telephony network 106 provided by the mobile network operator 102. For example, the signal strength component 304 can query the mobile operating system 214 through an application programming interface (API) to get a decibel-milliwatt (dBm) value for the strength of the signal received from the mobile network operator 102. In some cases, the signal strength component 304 is activated, or called by the connectivity component 302, after the connectivity component 302 has determined that the mobile computing device 110 has been without a connection to the mobile telephony network 106 for a predetermined amount of time. In some cases, the signal strength component 304 may continually, or periodically, monitor the signal strength at the mobile computing device 110 of the mobile telephony network 106.

In some cases, the signal strength component 304 may be activated in response to the connectivity component 302 determining that the connection to the mobile telephony network has been lost for a predetermined amount of time. With some mobile telephony networks, measuring signal strength is performed on a semi-regular basis and may consume a relatively large amount of energy from the mobile computing device's battery. By activating the signal strength component 304 as needed after a predetermined amount of time from the lost connectivity, unscheduled signal strength measurements of the mobile telephony network performed by the mobile computing device 200 may be limited or avoided.

The swap detector component 306 can determine 406 a likelihood that a SIM swap has taken place involving the SIM card 114 based on the signal strength and the network connectivity state communicated to it respectively from the connectivity component 302 and the signal strength component 304. For example, where the signal strength component 304 has determined that the mobile telephony network for the mobile computing device is above a given threshold, the swap detector component in some cases may sufficiently conclude that the likelihood that a SIM swap has taken pace is certain. Thus, in general the swap detector component 306 may initialize and communicate with the connectivity component 302 and the signal strength component 304. In some cases, the swap detector component 306 may confirm that the SIM swap has taken place, after for example, processing a probe request transmitted 502 by the probe component 316 discussed below.

Once a SIM swap has been confirmed or there is a likelihood that a SIM swap has taken place, the user notification component 308 may notify 408 the user of the likelihood that a SIM swap fraud has taken place. For example, the user notification component 308 may generate a popup message or other graphical indication on the display screen 223 on the mobile computing device through an API of the mobile operating system 214. The user notification component 308 may also send an email or instant message (e.g., over a wireless local area network (WLAN) connection) to notify the user.

In some cases when a SIM swap takes place, the mobile computing device 110 may not be capable of transmitting data to the Internet since it is not connected to the mobile telephony network 106. Thus, the WLAN component 310 may determine whether the WLAN element (e.g., adapter or interface) of the mobile computing device is enabled. For example, sometimes mobile computing devices may be able to selectively power off elements of the device. For instance, a user may want to turn-off the WLAN adapter when they are not near a WiFi hotspot. Thus, the WLAN component 310 can prompt the user to enable the WLAN element of the mobile computing device 110 if it is not active. This may allow the information concerning a potential SIM swap to be transmitted to a remote server 130, bank 140, etc., without necessarily being connected to the network 104 through the mobile telephony network 106. In addition to prompting the user to enable the WLAN element of the mobile computing device, the WLAN component 310 can also prompt the user to connect to a particular WLAN network by selecting a service set identifier (SSID) of a WLAN network. A list of SSIDs may be presented to the user for selection. In some cases, the list of SSIDs may be curated or sorted according to a set of predefined parameters. For instance, WLAN networks that do not require a password or key may be more useful to the user and thus may appear ahead of secured WLAN networks. Similarly, WLAN networks that the user has previously connected to may be easier for the user to reconnect to and may be safer than an unsecured WLAN network. The WLAN component 310 may communicate or operate in conjunction with the user notification component 308 to communicate messages to the user and receive input from the user.

The geolocation component 312 can determine a geolocation of the mobile computing device 110 and transmit the geolocation of the mobile computing device 110 to a remote server 130. The remote server 130 may use the geolocation to determine whether the mobile computing device 110 is within a coverage area of the mobile telephony network 106. Where the mobile computing device 110 is within a coverage area provided by the mobile telephony network 106 but unable to connect to the mobile telephony network, the determined likelihood that a SIM swap has taken place may increase. Conversely, where the geolocation component 312 is unable to obtain a geolocation of the mobile computing device 110, the likelihood that a SIM swap may be decreased in some embodiments. For instance, the mobile computing device 110 may at times be located in an underground area such as a basement or a subway tunnel and thus unable to receive satellite signals to determine a geolocation (e.g., with GPS). The geolocation component 312 may also be used in conjunction with the mitigation component 314 to notify the mobile wireless network operator 102 of the user's location (e.g., outside the country, etc.) In such instances, the mitigation component 314 may not only be used to block the fraudster's access to accounts and information, but may also provide helpful information on how to properly restore legitimate access to the user's accounts.

More generally, the mitigation component 314 can contact institutions such as a bank 140 with a fraud notification 610 informing them that a SIM swap has occurred or is potentially underway and that therefore authentication using the user's mobile telephone number is not reliable until further notice. The bank, or other sensitive institutions, may then take measures to enhance security surrounding the user's account or private information.

The probe component 316 can transmit 502 a probe 602 request to a remote server 130 requesting the remote server 130 to programmatically call a telephone number associated with the SIM card 114. The probe may be transmitted across a secure transport layer such as Transport Layer Security (TLS), Secure Sockets Layer (SSL), etc., and may include a telephone number to call, a device identifier, authentication information, and so forth. The call verification component 318 may then receive 504 an indication 604 from the remote server 130 that the mobile computing device 110 can expect to receive an incoming telephone call. Thus, the probe component 316 can be used in conjunction with the swap detector component 306 to determine the likelihood that a SIM swap has taken place. Thus, the call verification component 318 may determine 506 whether the mobile computing device 110 received the expected incoming telephone call and confirm 508 that the SIM swap has taken place in response to not receiving the expected incoming telephone call within a predetermined amount of time.

For example, the remote server 130 may programmatically call 606 the telephone number associated with the user's account for the mobile telephony network 104. If a SIM swap has taken place, the call will typically be directed to the perpetrator's 122 mobile computing device 120, whereas if a SIM swap has not taken place, the telephone call will typically be directed to the user's 112 mobile computing device 110.

In some cases, the probe indicator component 320 may receive an indication from the remote server 130 such as a call status. For instance, the call status may indicate that the telephone number was called but the incoming telephone call was not received. As another example, the call status may indicate whether the call was directed to voicemail prior to ringing. Ultimately, the remote server 130, may send a response 608 to the victim's device 110 notifying the victim whether they have been the victim of a SIM swap. The probe indicator component 320 may then notify the probe component 316 whether the SIM swap was confirmed. The probe component 316 may then in turn communicate the SIM swap to the call verification component 318 may then communicate and other components, such as the user notification component 308 and the mitigation component 314, for proper handling of the positive SIM swap confirmation, or alternatively for the proper handling of false positive.

In some cases, the indicator component 320 may receive an indication that include the caller identification (caller ID) for the expected incoming telephone call. The caller ID can be used to harden the security of the technology to differentiate the expected incoming telephone call from another call. A fraudster could potentially spoof a call to the victim to squelch the detection of the SIM swap. The indicator component's 320 ability to differentiate incoming calls based on caller ID, adds an extra layer of security. Specifically, the caller ID can help determine whether the mobile computing device correctly received the expected incoming telephone call.

In some cases, the indicator component 320 may be set to receive the incoming telephone call within a predetermined amount of time. Like the caller ID, a predetermined amount of time may be used to add an extra layer of security. The predetermined amount of time may be a relatively short window, and can potentially be shifted a few seconds in order to detect spoofed calls.

As will be understood by those familiar with the art, the invention may be embodied in other specific forms without departing from the spirit or essential characteristics thereof. Likewise, the particular naming and division of the portions, apps, components, modules, agents, managers, components, functions, procedures, actions, layers, features, attributes, methodologies, data structures and other aspects are not mandatory or significant, and the mechanisms that implement the invention or its features may have different names, divisions and/or formats. The foregoing description, for purpose of explanation, has been described with reference to specific embodiments. However, the illustrative discussions above are not intended to be exhaustive or limiting to the precise forms disclosed. Many modifications and variations are possible in view of the above teachings. The embodiments were chosen and described in order to best explain relevant principles and their practical applications, to thereby enable others skilled in the art to best utilize various embodiments with or without various modifications as may be suited to the particular use contemplated.

What is claimed is:

1. A computer implemented method for detecting a fraudulent subscriber identity module swap, at least a portion of the method being performed by a computing device comprising at least one processor, the method comprising the steps of:
    determining, by a mobile app executing on a mobile computing device, a network connectivity state for the mobile computing device to a mobile telephony network provided by a mobile network operator, the mobile computing device being associated with a subscriber identity module associated with the mobile network operator;
    determining, by the mobile app executing on the mobile computing device, a signal strength at the mobile computing device of the mobile telephony network provided by the mobile network operator;
    determining, by the mobile app executing on the mobile computing device, a likelihood that a subscriber identity module swap has taken place involving the subscriber identity module based on the signal strength and the network connectivity state; and
    determining, by the mobile app executing on the mobile computing device, whether a wireless local area network element is disabled on the mobile computing device; and
    prompting, by the mobile app executing on the mobile computing device, the user to enable the wireless local area network element of the mobile computing device based on the determination of whether the wireless local area network element is disabled.

2. The method of claim 1, further comprising notifying, by the mobile app executing on the mobile computing device, a user of the mobile computing device of the likelihood that the subscriber identity module swap has taken place involving the subscriber identity module associated with the mobile computing device.

3. The method of claim 1, further comprising:
    transmitting, by the mobile app executing on the mobile computing device, a probe request to a remote server requesting the remote server to programmatically call a telephone number associated with the subscriber identity module;
    receiving, by the mobile app executing on the mobile computing device, an indication that the mobile computing device can expect to receive an incoming telephone call; and
    determining, by the mobile app executing on the mobile computing device, whether the mobile computing device received the expected incoming telephone call,
    wherein determining the likelihood that the subscriber identity module swap has taken place involving the subscriber identity module is further based on the received indication that the mobile computer device can expect to receive the incoming telephone call and the determination of whether the mobile computer device received the expected incoming telephone call.

4. The method of claim 3, further comprising confirming, by with the mobile app executing on the mobile computing device, that the subscriber identity module swap has taken place in response to not receiving the expected incoming telephone call.

5. The method of claim 3, further comprising:
receiving, by with the mobile app executing on the mobile computing device, a call status from the remote server; and
confirming, by with the mobile app executing on the mobile computing device, that the subscriber identity module swap has taken place in response to the call status indicating that the telephone number was callable but the incoming telephone call was not received.

6. The method of claim 3, wherein the indication includes a caller identification for the expected incoming telephone call, and determining whether the mobile computing device received the expected incoming telephone call is based on the caller identifier.

7. The method of claim 3, wherein determining whether the mobile computing device received the expected incoming telephone call is based on a predetermined amount of time elapsing.

8. The method of claim 1, further comprising:
determining, by the mobile app executing on the mobile computing device, a geolocation of the mobile computing device; and
transmitting, by the mobile app executing on the mobile computing device, the geolocation of the mobile computing device to a remote server.

9. The method of claim 1, further comprising transmitting, by the mobile app executing on the mobile computing device, notification that the subscriber identity module swap has taken place to an identity theft protection service provider.

10. The method of claim 1, wherein the mobile telephony network further comprises a cellular network.

11. The method of claim 1, further comprising:
determining, by the mobile app executing on the mobile computing device, a connection to the mobile telephony network provided by the mobile network operator has been lost for a threshold amount of time,
wherein the signal strength is determined responsive to the connection having been lost for the threshold amount of time.

12. The method of claim 1, further comprising:
determining, by the mobile app executing on the mobile computing device, whether the network connectivity state to the mobile telephony network has been lost for a predetermined amount of time or is limited to emergency telephone calls;
determining, by the mobile app executing on the mobile computing device, that the subscriber identity module swap has taken place involving the subscriber identity module responsive to the signal strength being above a predetermined threshold, and the determined network connectivity state.

13. A computer system detecting a fraudulent subscriber identity module swap, the computer system comprising:
system memory;
a connectivity component residing in the system memory, the connectivity component being programmed to determine, by a mobile app executing on a mobile computing device, a network connectivity state for the mobile computing device to a mobile telephony network provided by an mobile network operator, the mobile computing device being associated with a subscriber identity module associated with the mobile network operator;
a signal strength component residing in the system memory, the signal strength component being programmed to determine, by the mobile app executing on the mobile computing device, a signal strength at the mobile computing device of the mobile telephony network provided by the mobile network operator;
a swap detector component residing in the system memory, the swap detector component being programmed to determining, by the mobile app executing on the mobile computing device, a likelihood that a subscriber identity module swap has taken place involving the subscriber identity module based on the signal strength and the network connectivity state;
a WLAN component residing in the system memory, the WLAN component being programmed to determine, whether a wireless local area network element is disabled on the mobile computing device,
wherein the user notification component is further programmed to prompt the user to enable the wireless local area network element of the mobile computing device based on the determination of whether the wireless local area network is disabled; and
at least one processor configured to execute the components.

14. The computer system of claim 13, further comprising a user notification component residing in the system memory, the user notification component being programmed to notify, by the mobile app executing on the mobile computing device, a user of the mobile computing device of the likelihood that the subscriber identity module swap has taken place involving the subscriber identity module associated with the mobile computing device.

15. The computer system of claim 13, further comprising:
a probe component residing in the system memory, the probe component being programmed to transmit, by the mobile app executing on the mobile computing device, a probe request to a remote server requesting the remote server to programmatically call a telephone number associated with the subscriber identity module;
a probe indicator component residing in the system memory, the probe indicator component being programmed to receive, by the mobile app executing on the mobile computing device, an indication that the mobile computing device can expect to receive an incoming telephone call; and
a call verification component residing in the system memory, the call verification component being programmed to determine, by the mobile app executing on the mobile computing device, whether the mobile computing device received the expected incoming telephone call,
wherein determining the likelihood that the subscriber identity module swap has taken place involving the subscriber identity module is further based on the received indication that the mobile computer device can expect to receive the incoming telephone call and the determination of whether the mobile computer device received the expected incoming telephone call.

16. The computer system of claim 15, wherein the call verification component is further programmed to confirm that the subscriber identity module swap has taken place in response to not receiving the expected incoming telephone call.

17. The computer system of claim 15, wherein the call verification component is further programmed to:
receive a call status from the remote server, and
confirm that the subscriber identity module swap has taken place in response to the call status indicating that the telephone number was callable but the incoming telephone call was not received.

18. A computer implemented method for detecting a fraudulent subscriber identity module swap, at least a portion of the method being performed by a computing device comprising at least one processor, the method comprising the steps of:
determining, by a mobile app executing on a mobile computing device, a network connectivity state for the mobile computing device to a mobile telephony network provided by a mobile network operator, the mobile computing device being associated with a subscriber identity module associated with the mobile network operator;
determining, by the mobile app executing on the mobile computing device, a signal strength at the mobile computing device of the mobile telephony network provided by the mobile network operator;
determining, by the mobile app executing on the mobile computing device, a likelihood that a subscriber identity module swap has taken place involving the subscriber identity module based on the signal strength and the network connectivity state;
transmitting, by the mobile app executing on the mobile computing device, a probe request to a remote server requesting the remote server to programmatically call a telephone number associated with the subscriber identity module;
receiving, by the mobile app executing on the mobile computing device, an indication that the mobile computing device can expect to receive an incoming telephone call; and
determining, by the mobile app executing on the mobile computing device, whether the mobile computing device received the expected incoming telephone call,
wherein determining the likelihood that the subscriber identity module swap has taken place involving the subscriber identity module is further based on the received indication that the mobile computer device can expect to receive the incoming telephone call and the determination of whether the mobile computer device received the expected incoming telephone call.

19. The method of claim 18, further comprising notifying, by the mobile app executing on the mobile computing device, a user of the mobile computing device of the likelihood that the subscriber identity module swap has taken place involving the subscriber identity module associated with the mobile computing device.

20. The method of claim 18, further comprising:
determining, by the mobile app executing on the mobile computing device, a geolocation of the mobile computing device; and
transmitting, by the mobile app executing on the mobile computing device, the geolocation of the mobile computing device to a remote server.

* * * * *